(12) United States Patent
Langsford

(10) Patent No.: US 6,768,444 B2
(45) Date of Patent: Jul. 27, 2004

(54) METHOD OF INTERFERENCE SUPPRESSION IN A RADAR SYSTEM

(75) Inventor: Peter Langsford, Chelmsford (GB)

(73) Assignee: Alenia Marconi Systems Limited, Chelmsford (GB)

( * ) Notice: Subject to any disclaimer, the term of this patent is extended or adjusted under 35 U.S.C. 154(b) by 0 days.

(21) Appl. No.: 10/344,264

(22) PCT Filed: Aug. 10, 2001

(86) PCT No.: PCT/GB01/03613

§ 371 (c)(1),
(2), (4) Date: Jul. 24, 2003

(87) PCT Pub. No.: WO02/14896

PCT Pub. Date: Feb. 21, 2002

(65) Prior Publication Data

US 2004/0027268 A1 Feb. 12, 2004

(30) Foreign Application Priority Data

Aug. 11, 2000 (GB) .............................. 0019757
Aug. 31, 2000 (GB) .............................. 0021276

(51) Int. Cl.[7] .............................. G01S 7/36; G01S 7/28; G01S 7/292
(52) U.S. Cl. .............................. 342/17; 342/13; 342/16; 342/19; 342/89; 342/175; 342/189; 342/195; 342/378
(58) Field of Search .............................. 342/13–20, 175, 342/192–197, 368, 378–384, 89–103, 159–164, 189

(56) References Cited

U.S. PATENT DOCUMENTS

| | | | |
|---|---|---|---|
| 4,367,472 A | | 1/1983 | Hauptmann et al. |
| 4,434,424 A | | 2/1984 | Old |
| 4,439,769 A | | 3/1984 | Masa |
| 4,554,548 A | | 11/1985 | Brilman et al. |
| 4,573,052 A | * | 2/1986 | Guillerot et al. ........... 342/19 k |
| 4,891,647 A | * | 1/1990 | Auvray ......................... 342/16 |
| 4,931,977 A | | 6/1990 | Klemes |
| 4,959,653 A | | 9/1990 | Ganz ............................ 342/17 |
| 5,173,700 A | * | 12/1992 | Chesley ....................... 342/17 |
| 5,311,192 A | * | 5/1994 | Varga et al. .................. 342/17 |
| 5,359,329 A | * | 10/1994 | Lewis et al. .................. 342/17 |
| 5,440,308 A | | 8/1995 | Dybdal et al. ................ 342/17 |
| 5,600,326 A | * | 2/1997 | Yu et al. ....................... 342/17 |
| 6,018,310 A | | 1/2000 | Sirven ......................... 342/159 |
| 6,084,540 A | | 7/2000 | Yu ............................... 342/17 |
| 6,538,597 B1 | * | 3/2003 | Steudel ........................ 342/17 |
| 6,650,271 B1 | * | 11/2003 | Simone et al. ............... 342/16 |

* cited by examiner

Primary Examiner—Bernarr E. Gregory
(74) Attorney, Agent, or Firm—Crowell & Moring LLP

(57) ABSTRACT

The invention relates to a method of interference suppression in a radar system (10) and also to a system (10) operating according to the method. The system (10) incorporates a first antenna (40) and associated electronic circuits for emitting interrogating radar radiation towards a remote scene (S). Moreover, the system (10) also incorporates a second antenna (45) and associated electronic circuits for receiving interrogating radiation reflected from the scene (S) and generating correponding first and second processed signals. The first and second processed signals correspond to a broader main beam response of the antenna (45) and to a narrower main beam response thereof respectively. By mutually comparing the first and second processed signals, the system (10) is operable to identify those second processed signals affected by interference from the scene (S). The system (10) also incorporates electronic units (430, 440) operable to calculate adaptive weights for modifying the narrower response to steer its nulls in directions of interfering sources in the scene (S) when the narrower response is used to generate an overall output from the system (10), the units operable to selectively use second signal samples identified as being subject to interference for calculating the adaptive weights. The system (10) is operable to store its first and second signals for a period not less than that associated with updating the adaptive weights, thereby providing the system (10) with enhanced interference suppresssion characteristics.

9 Claims, 6 Drawing Sheets

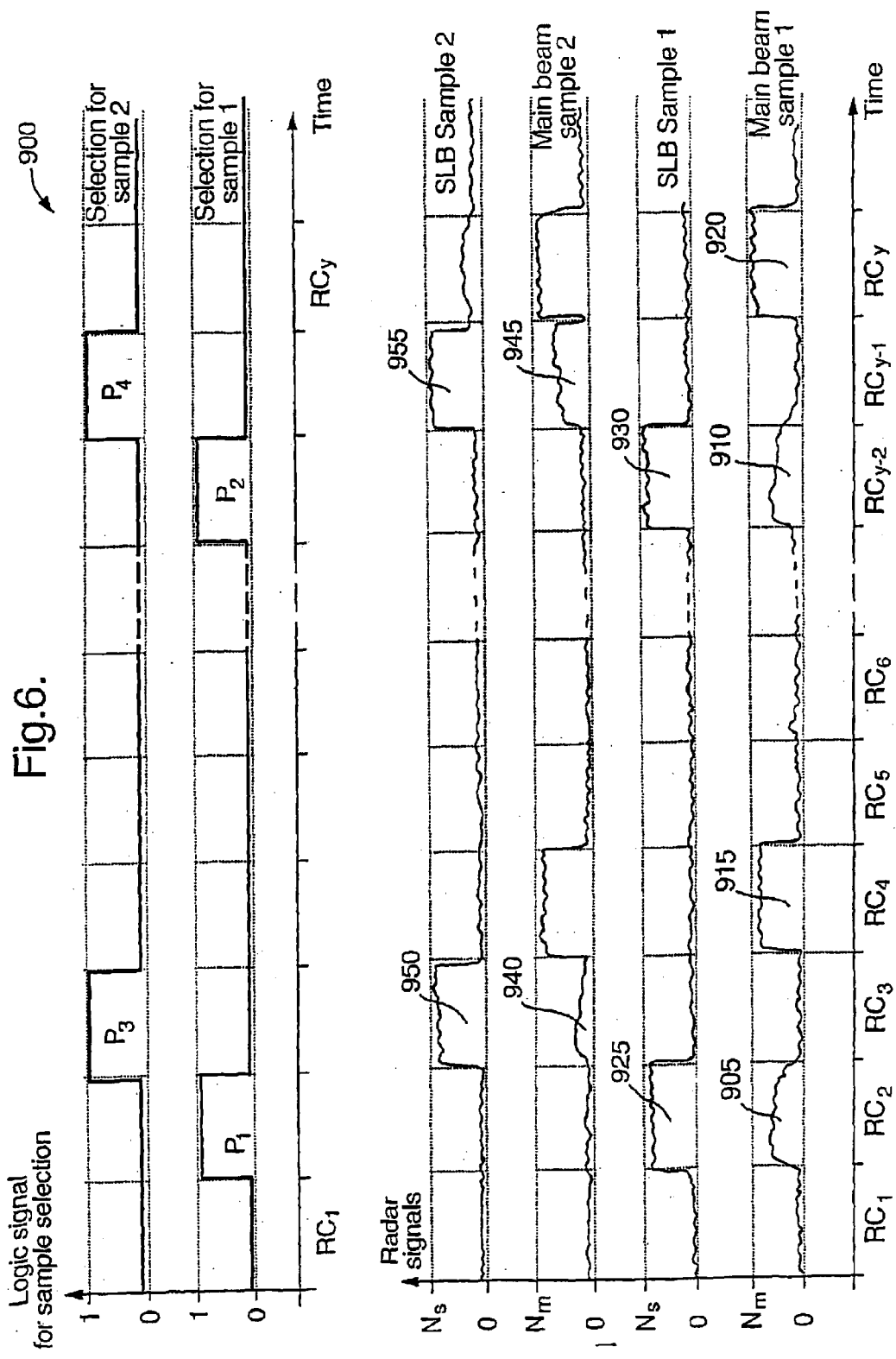

METHOD OF INTERFERENCE SUPPRESSION IN A RADAR SYSTEM

The present invention relates to a method of interference suppression in a radar system. The invention also relates to a radar system operating according to the method.

DESCRIPTION OF THE PRIOR ART

In a convenonl radar system, an antenna assembly is employed to emit and receive radar radiation, such radiation being defined as electromagnetic radiation typically in a frequency range of 3 MHz to 100 GHz. The antenna assembly exhibits a non-ideal polar response comprising a direction of relatively higher gain and number of sidelobes which lie in directions noncoincident with the direction of higher gain. Radiation emitted from the assembly is principally concentrated in the direction of higher gain, hereinafter referred to as a main beam direction of the system, with residual radiation distributed in sidelobe directions. Likewise, radiation received at the assembly is most sensitively received in the main beam direction and relatively less sensitively received in the sidelobe directions. In the polar response, a number of nulls separate the main beam from the sidelobes and also mutually separate the sidelobes.

In the conventional system, the assembly can comprise a plurality of antenna elements whose input and output signals corresponding to radar radiation emitted and received thereat respectively. The assembly is electronically steerable by individually scaling and phase shifting the signals to and from the elements. Alternatively, the assembly can comprise a single relatively larger antenna element which is mechanically scanned in a field of view of the system. In some conventional systems, a combination of mechanical and electronic steering is employed.

Although an ideal radar system includes only a main beam in its antenna assembly polar response, technical design limitations, for example practical radar antenna aperture size limitations, mean that conventional radar systems exhibit sidelobes in their polar responses. Such sidelobes make the conventional radar systems susceptible to sources of interference lying in directions corresponding to the sidelobes. The sources of interference can comprise other radar systems for example.

There are several methods presently employed to counteract effects of interfering sources in conventional radar systems. These methods are described in a widely available published book "Antenna-Based Signal Processing Techniques for Radar Systems" by Alfonso Farina, published by Artech House ISBN 0-89006-396-6, 1992.

A first well known conventional method to counteract interference is known as sidelobe blanking (SLB). In this first method, a conventional radar system employs a first antenna assembly exhibiting a relatively angularly narrow main beam to interrogate its field of view and receive corresponding echo radiation therefrom; angularly narrow in this context means typically in the order of 1° between response −3dB points. The system additionally employs a second antenna assembly exhibiting a relatively much broader main beam having less gain compared to the narrow main beam to receive the echo radiation; much broader is this context means typically in the order of 20° between response −3dB points. For each direction in the field of view in which the antennae are scanned, a first signal corresponding to the radiation received at the first antenna is compared with a second signal corresponding to the radiation received at the second antenna For a given direction in the field of view, the first signal is considered to come from a sidelobe direction if the second signal is greater in magnitude than the magnitude of the first signal multiplied by a predetermined factor.

In the first method, the system can incorporate two separate antenna assemblies for generating the narrow main beam and the much broader main beam. Alternatively, the system can derive the narrow and broader beams from a single multielement antenna assembly by suitably combining in phase and amplitude signals generated by the elements.

SLB is effective at identifyg interference from pulsed interference souses in the sidelobe directions. However, SLB suffers a problem that a radar system employing it is effectively blind to real targets whose radar echoes arrive at an identical time to that of an interfering source. Thus, an interfering source which is able to generate a number of false targets at different times of arrival at a radar system employing SLB is capable of masking real targets over a substantial part of the field of view.

A second well known conventional method of counteracting interference is known as adaptive beam forming and has been widely reported in scientific literature and also in the aforementioned book. In the second method, a conventional radar system comprises a multielement antenna assembly. Radar radiation received and emitted at each element gives rise to corresponding output and input signals respectively. The output signals are coherently combined to create a composite received signal corresponding to a composite radar receive main beam which has nulls steered in directions of sources of interference within the field of view of the system.

When coherently combining the output signals to generate the composite signal in the second method, the signals are manipulated in relative phase and amplitude by weighting coefficients which are calculated within the system. Calculation of the coefficients is mathematically non-trivial and is described in Chapter 4 of the aforementioned book. It involves correlation of sample signals including signal components corresponding to all sources of interference to be eliminated. Moreover, the sample signals must also be substantially free of target and clutter signals which can adversely affect the accuracy to which the coefficients are calculated If target originating signals are present, nulls will be steered in directions of the targets.

The second method suffers a problem that nulls associated with the composite signal are only steered in directions of interfering sources which generate corresponding signal components in the sample signals. Thus, if the interfering sources radiate radar radiation noise continuously, it is likely that components of their radar noise will be present in the sample signals and therefore effectively nulled. However, if the interfering sources radiate radar radiation in the form of periodic pulses, then there is a possibility that components corresponding to the pulses are not included in the sample signals and are thereby not effectively nulled.

Thus, there are situations where the first and second methods are unable to effectively counteract the effects of interfering sources within the field of view of the conventional system.

The inventor has appreciated that the problems described above can be addressed by an alternative method of operating a radar system which synergistically combines aspects of the first and second methods.

SUMMARY OF THE INVENTION

According to a first aspect of the present invention, there is provided a method of noncontinuous jamming interference suppression in a radar system incorporating emitting means for emitting interrogating radiation towards a remote scene and receiving means for receiving corresponding echo radiation returned from the scene in response to the interrogating radiation, the method including the steps of:

(a) emitting the interrogating radiation from the emitting means towards a selected region of the scene;

(b) receiving first echo radiation substantially from the selected region of the scene at the receiving means and generating a corresponding first received signal;

(c) receiving second echo radiation substantially from the selected region and other regions surrounding the selected region and generating a corresponding second received signal;

(d) mutually comparing the first and second signals and determining therefrom portions of the first signal subject to noncontinuous jamming interference;

(e) repeating steps (a) to (d) where necessary for one or more other selected regions until sufficient samples of the signals are available for performing an adaptive weight calculation;

(f) selectively using the portions of the first signal where non-continuous jamming interference is detected in the calculation for calculating adaptive weight coefficients;

(g) processing the signals using the adaptive weight coefficients to generate an overall output from the system corresponding to radiation reflected from one or more selected regions, the overall output being at least partially corrected for noncontinuous jamming interference enabling target detection during periods of such interference; and (h) repeating steps (a) to (g) until all the selected regions of the scene to be interrogated have been interrogated.

The invention provides the advantage that the method makes the system capable of employing a relatively narrower receiving means polar response in step (b) and a relatively broader receiving means polar response in step (c) to identify in step (d) those signals subject to interference and thereby use portions of the signals subject to interference selectively when calculating the adaptive weight coefficients in step (I) to enhance interference suppression provided by the system.

Advantageously, to improve interference suppression provided by the system operating according to the method, signals are stored in storing means of the system for a period not less than that required for updating the adaptive weight coefficients. Storing the signals enables more representative samples to be used when calculating the adaptive weight coefficients.

Conveniently, for determining whether or not interference is present, the method can exploit a condition where the second signal is greater in magnitude than the magnitude of the first signal subject to a threshold scaling constant for a given selected region as being indicative of the first signal being affected by interference. Advantageously, the scaling constant can be made variable for coping with different types of interference, for example pulsed interference as compared to continuous interference.

Beneficially, in order to provide a more agile radar system, the method can employ electronic steering in steps (b) and (c) for steering the receiving means to different selected regions of the scene. Additionally, in order to obtain a wide coverage of the scene, the method can employ mechanical steering to steer the receiving means to different selected regions.

Conveniently, the receiving means can comprises a multielement antenna and the adaptive weight coefficients can be used to vectorially multiply signals generated by the elements in response to radiation received from the scene thereat for generating the overall output from the system. Multielement antennae are susceptible to electronic steering and hence are capable of imparting greater agility to the radar system when incorporated therein compared to purely mechanically steered single element antennae incorporated therein.

In a second aspect, the invention provides a radar system operating according to the method of the first aspect of the invention.

An embodiment of the invention will now be described, by way of example only, with reference to the following diagrams in which:

BRIEF DESCRIPTION OF THE DRAWINGS

FIG. 6 is a schematic representation of radar signals received from selected field cells in FIG. 5, the signals being partitioned in range cells corresponding to reception time after emitting interrogating radiation towards the field cells.

DETAILED DESCRIPTION OF THE INVENTION

Figure 1:
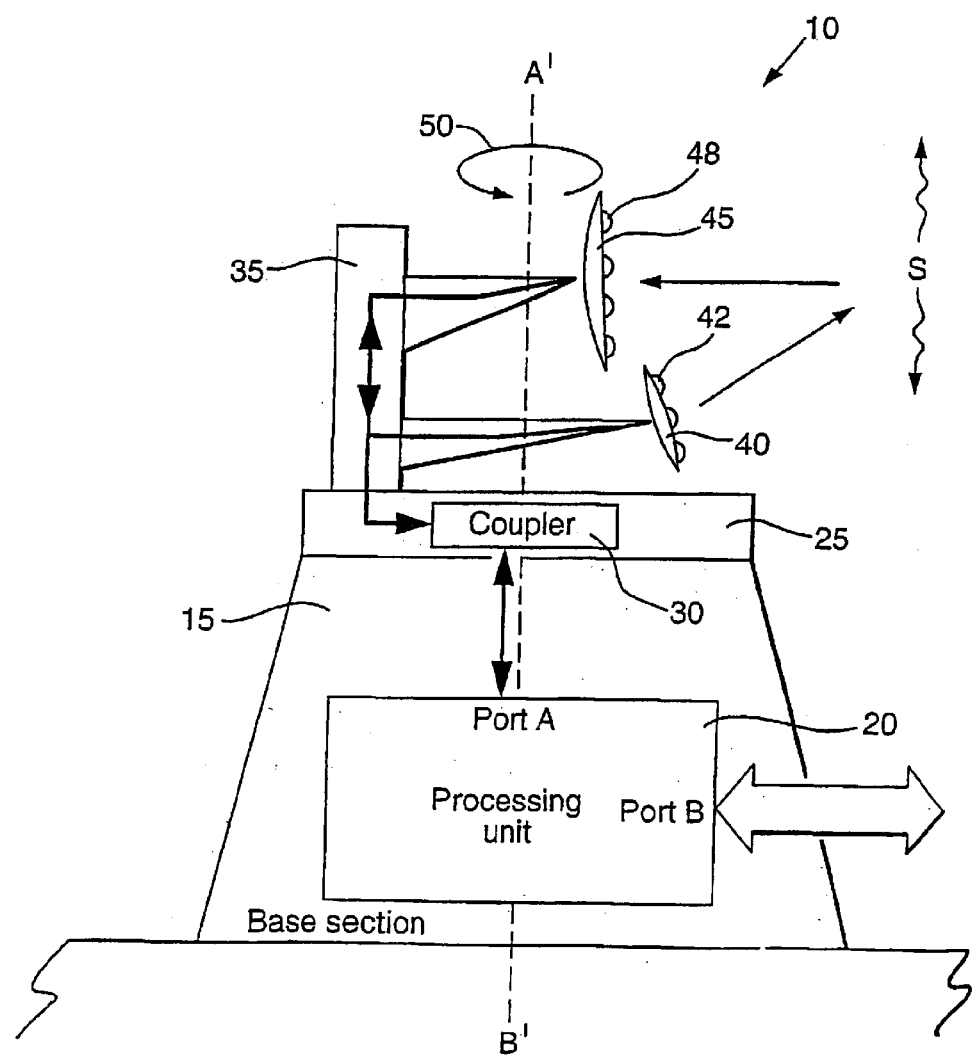
FIG. 1 is a schematic illustration of a radar system according to the invention.

Referring to FIG. 1, there is shown a radar system of the invention indicated generally by 10. The system 10 includes a base section 15 housing a processing unit 20. The base section 15 is connected to a turret 25 which is mechanically rotatable relative to the base section 15. The unit 20 interfaces to other equipment (not shown) connected to its port B and to an antenna assembly via its port A. Connections from the port A of the unit 20 are fed via a rotary coupler 30 to the antenna assembly which comprises a vertical support member 35 to which are attached a radiating antenna 40 and a receiving antenna 45. The radiating antenna 40 incorporates a plurality of antenna elements such as an element 42. Likewise, the receiving antenna 45 incorporates a plurality of antenna elements such as an element 48. Separate antennae 40, 45 are shown in order to simplify the description. More usually, one antenna will be used for both transmission and reception of microwave radiation.

The turet 25 supporting its associated antennae 40, 45 is rotatable relative to the base section 15 about an axis A'–B' in a rotational direction as indicated by an arrow 50.

In operation, the system 10 emits interrogating microwave radiation from the antenna 40 towards a remote scene represented by "S". Radiation reflected from the scene is received at the antenna 45 which generates a number of receiver signals in response which are amplified and then conveyed through the coupler 30 to the processing unit 20 for processing therein. Corresponding processed output signals and data are subsequently output through the port B to the other equipment.

The antennae 40, 45 are phased arrays which can be electronically steered from the processing unit 20 to interrogate and view different regions of the scene over a limited range of directions. In order to enable the antennae 40, 45 to interrogate the scene in full, the antennae 40, 45 are adapted to be rotated on the turret 25 relative to the base section 15. In operation, the turret 25 rotates relative to the base section 15 at a rate in the order of 1 rotation per second.

Figure 2:
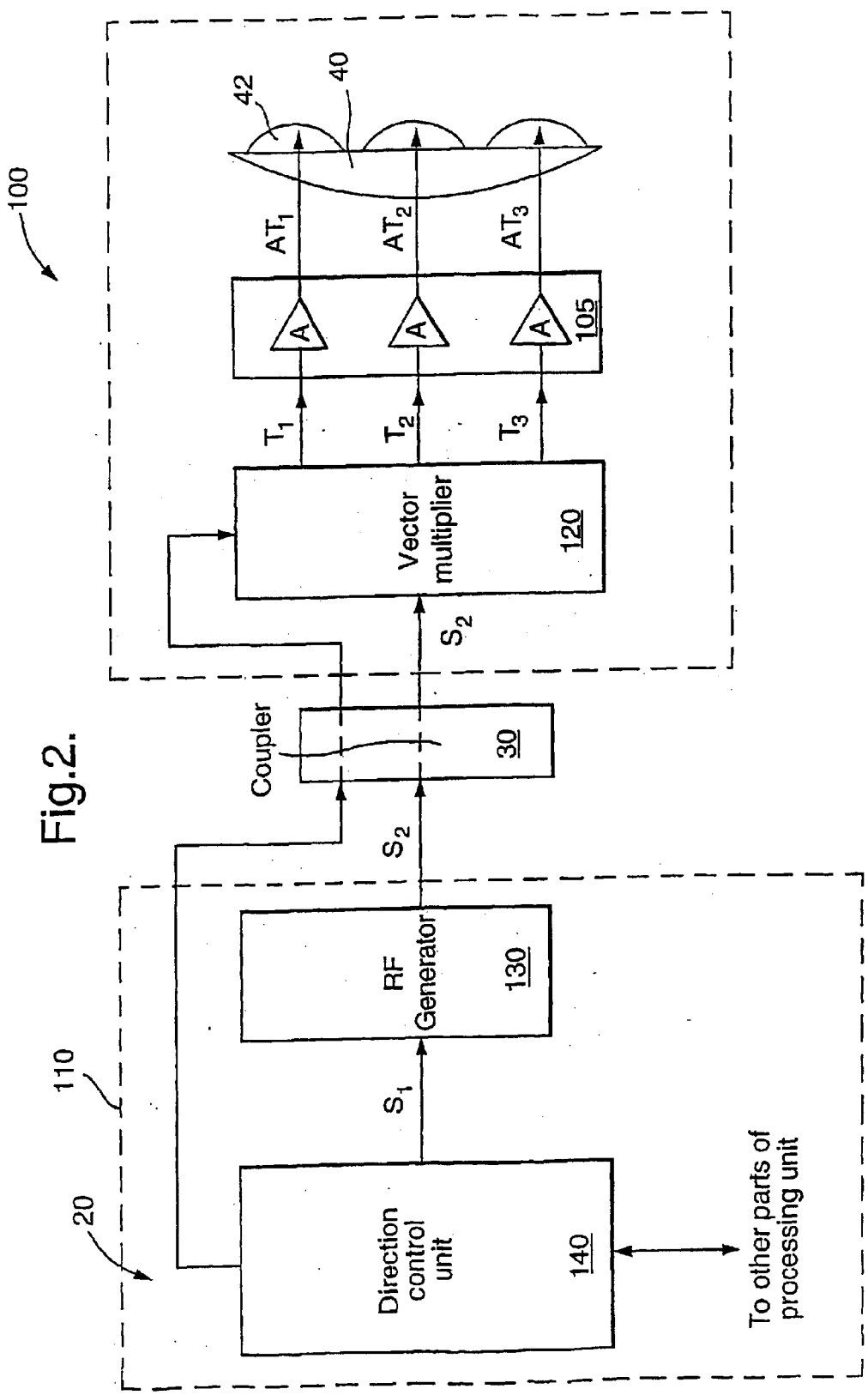
FIG. 2 is a schematic diagram of signal processing units included within the system illustrated in FIG. 1 associated with emitting microwave radiation from the system.

In order to further elucidate operation of the processing unit 20 in combination with the antenna 40 emitting interrogating microwave radiation towards the scene "S", FIG. 2 will now be described. In FIG. 2, there is shown indicated by 100 the antenna 40 linked via a bank of microwave power amplifiers 105 mounted on the turret 25 and then via a vector multiplier unit 120 and through the coupler 30 to the processing unit 20. Sub-parts of the processing unit 20 are shown within a dotted line 110. The subparts include a controllable microwave generator 130 and a direction control unit 140.

In practice, the antenna 40 includes in the order of two thousand antenna elements and associated circuits. Only three such antenna elements of the antenna 40 are shown in FIG. 2 for clarity.

The control unit 140 comprises a first output which is connected to a first input of the vector multiplier unit 120, and a second output $S_1$ connected to the generator 130. An output $S_2$ from the generator 130 is coupled to an input of the multiplier unit 120. The vector multiplier unit 120 incorporates a number of outputs including outputs $T_1$, $T_2$, $T_3$ which are connected to associated power amplifiers in the bank 105. Associated amplified outputs $AT_1$, $AT_2$, $AT_3$ are coupled to respective antennae elements of the antenna 40.

Operation of the antenna 40 in combination with the bank of amplifiers 105 and the processing unit 20 will now be described with reference to FIG. 2. The direction control unit 140 controls a desired pointing direction in which the system 10 is to emit and receive microwave radiation when interrogating the "S", namely the unit 140 controls directions of main beams of the antennae 40, 45. The control unit 140 outputs control data to rotate the turret 25 when the antennae 40, 45 cannot be electronically steered to the desired pointing direction. When electronically steering the antenna 40, the unit 140 outputs coefficient values which are pre-calculated and pre-recorded in a memory of the unit 140 to the first input of the multiplier unit 120. Then the control unit 140 triggers the generator 130 to generate a pulsed microwave signal $S_2$ which passes via the coupler 30 to the multiplier unit 120 which attenuates and phase shifts the pulsed signal to provide corresponding vector multiplied signals at the outputs $T_1$, $T_2$, $T_3$. The multiplied signals from the outputs $T_1$, $T_2$, $T_3$ propagate to the bank of amplifiers 105 in which they are amplified to provide corresponding amplified signals at the outputs $AT_1$, $AT_2$, $AT_3$ which couple to their respective antenna elements wherefrom they are emitted as microwave radiation towards the scene "S".

Relative phasing and amplitude of the signals in the multiplier unit 120 results in signals at the outputs $AT_1$, $AT_2$, $AT_3$ which, when emitted as radiation from the antennae elements of the antenna 40, combine at the scene "S" to provide a beam of microwave radiation in the desired pointing direction and only residual sidelobe radiation in other directions. Beam steering using vector multipliers is well known in the art of radar system design.

Figure 3:
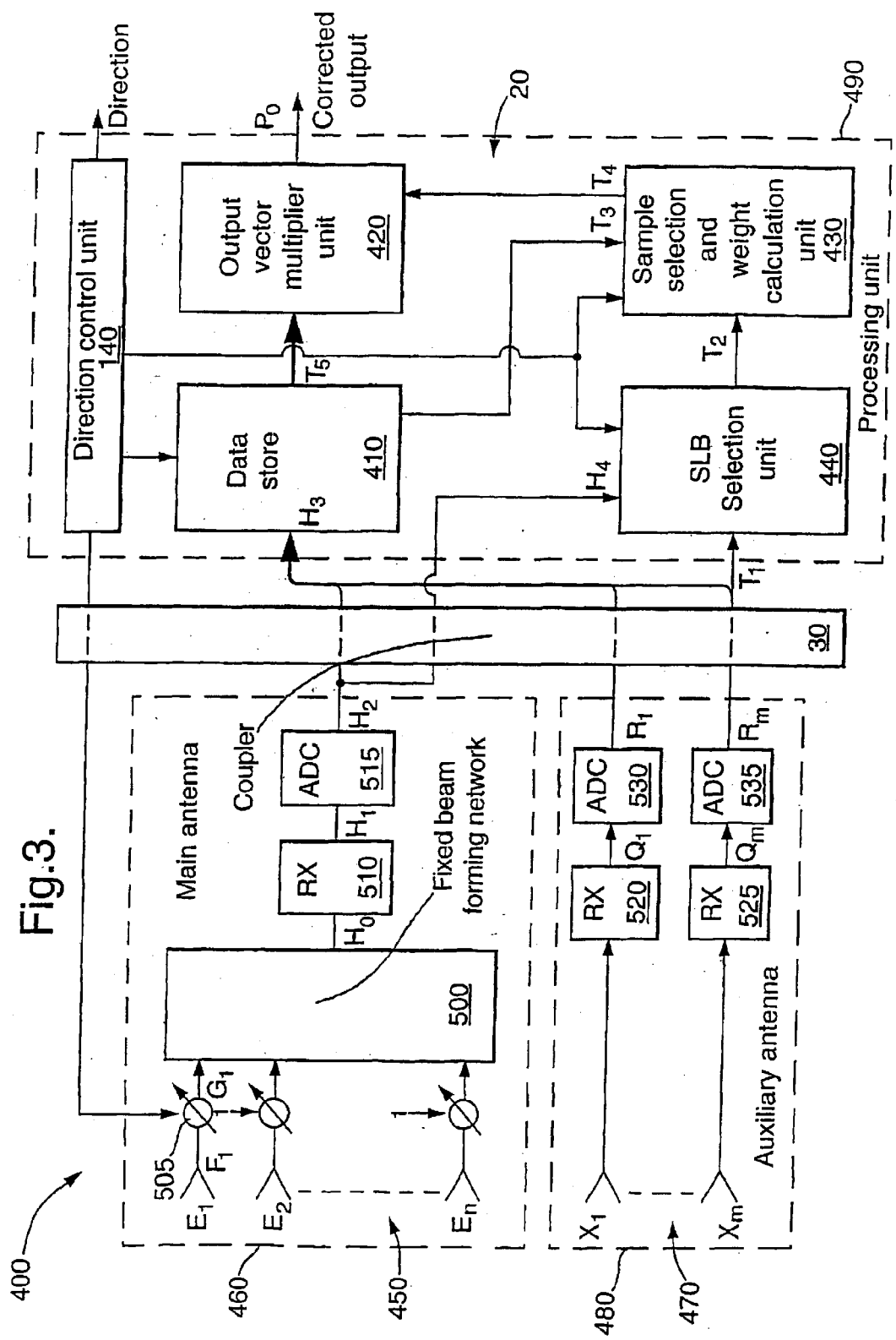
FIG. 3 is a schematic diagram of a first embodiment of signal processing units included within the system illustrated in FIG. 1 associated with processing microwave radiation received at the system.
Figure 4:
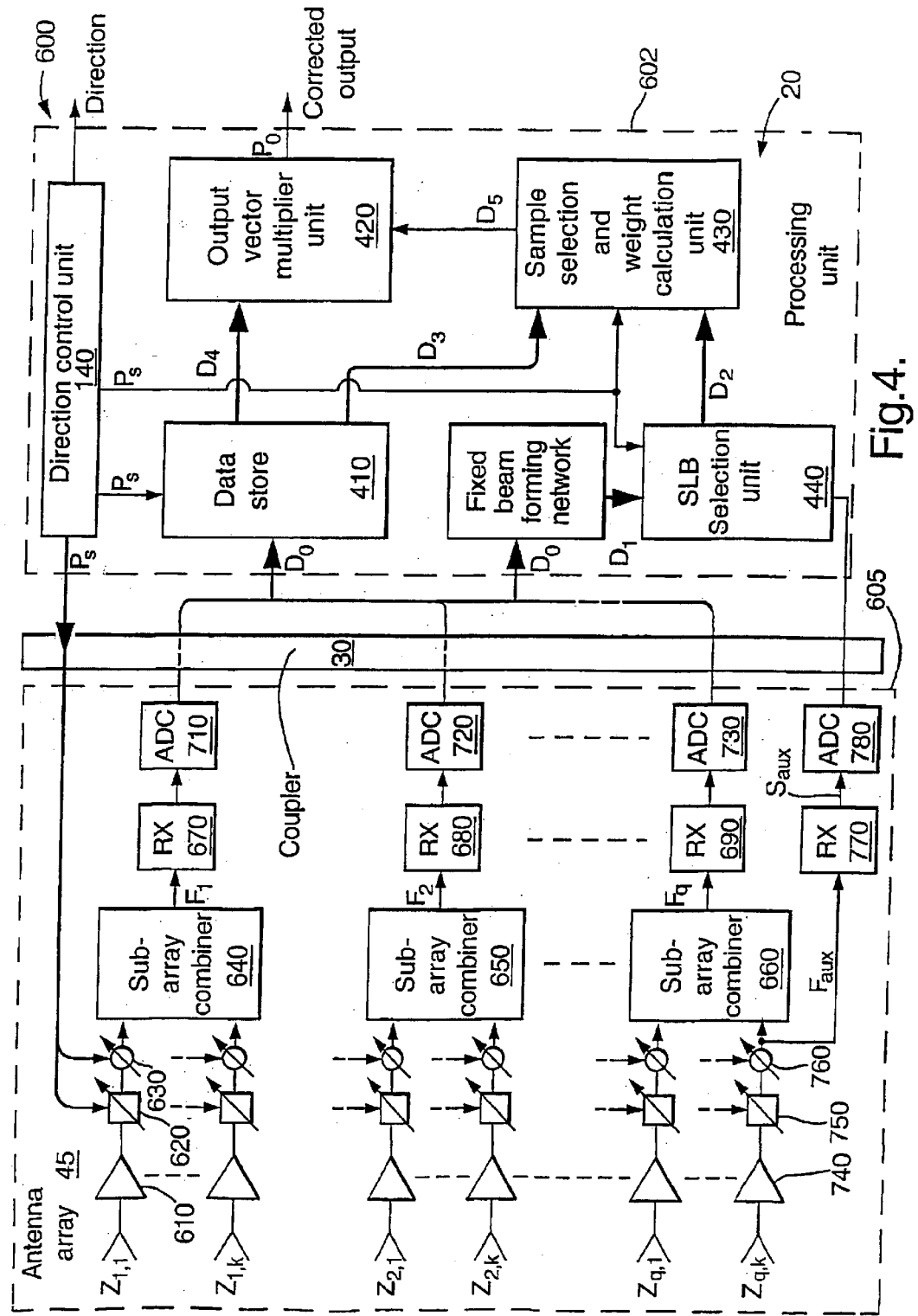
FIG. 4 is a schematic diagram of a second embodiment of signal processing units included within the system illustrated in FIG. 1 associated with processing microwave radiation received at the system.

Other parts of the radar system 10 will now be described. The receiving antenna 45 and signal processing assemblies associated therewith mounted on the turret 25, together with the processing unit 20 in the base section 15, can be implemented in several alternative configurations. FIGS. 3 and 4 are illustrations of first and second configurations 400, 600 respectively for the receiving antenna 45 and its associated signal processing circuits. Both configurations share common features of the direction control unit 140, a data store 410, an output vector multiplier unit 420, a sample selection and weight calculation unit 430 and a SLB selection unit 440.

Referring to FIG. 3, the first configuration 400 comprises the antenna 45 which is subdivided into a main antenna indicated by 450 and included within a dotted line 460, and into an auxiliary antenna indicated by 470 and included within a dotted line 480. The processing unit 20 is shown included within a dotted line 490 and comprises the data store 410 and the aforementioned units 140, 420, 430, 440. The main antenna 450 is designed to provide a relatively narrow-beam microwave polar reception response whereas the auxiliary antenna 470 is operable to provide a relatively broad-beam microwave polar reception response; narrow and broad in this context corresponds to in the order of 1° and 30° respectively for polar −3dB response points. The main and auxiliary antennae 450, 470 can have their associated elements arranged spatially in two separate respective clusters or, alternatively, can have their elements collocated all in one combined element array.

The main antenna 450 comprises antenna elements $E_1$ to $E_n$, where an index n is typically in a range of 100 to 5000 and preferably in the order of 2000. Each element E includes an associated received microwave signal output which is coupled to its corresponding variable phase shifter. Phase shifted microwave outputs from the phase shifters are coupled to corresponding microwave inputs of a passive fixed beam-forming network 500 operable to combine microwave frequency signals to generate a combined signal at an output $H_0$ thereof. For example, the element $E_1$ includes a microwave signal output $F_1$ which is coupled through its corresponding variable phase shifter 505 to an input $G_1$ of the network 500. The microwave output $H_0$ is connected to an input of a microwave receiver 510. The receiver 510 comprises a heterodyned output $H_1$ whose associated output base-band signal is at a frequency in the order of MHz. The output $H_1$ is coupled to an input of an analogue-to-digital converter (ADC) 515. A digital output $H_2$ of the converter 515 is connected through the coupler 30 to the processing unit 20, namely the output $H_2$ is coupled to an input $H_3$ of the data store 410 and also connected to a first digital input, of the SLB selection unit 440. Thus, in operation, microwave radiation received at the main antenna 450 from the scene "S" is converted into digital data at the output $H_2$ which is conveyed through the coupler 30 to the input $H_3$ of the data store 410 and also to the input $H_4$ of the SLB selection unit 440.

The auxiliary antenna 470 comprises antenna elements $X_1$ to $X_m$ where an index m is typically in a range of 1 to 5000 and preferably in the order of 500. Each of the antenna elements X has associated therewith its own microwave receiver for heterodyning microwave radiation input thereinto to generate a corresponding base-band output analogue signal of a few MHz frequency; for example, the elements $X_1$, $X_m$ are coupled to corresponding microwave receivers 520, 525 respectively. Each of the microwave receivers is connected to a corresponding ADC for converting base-band signals from their associated microwave receivers into digital data; for example, the microwave receivers 520, 525 include base-band signal outputs $Q_1$, $Q_m$ which are connected to ADCs 530, 535 for generating corresponding digital data at outputs $R_1$, $R_m$ respectively. The data from the ADCs is coupled through the coupler 30 to the processing unit 20. The outputs $R_1$ to $R_{m-1}$ are connected to the input $H_3$ of the data store 410 whereas the output $R_m$ is connected to a data input $T_1$ of the SLB selection unit 440. The data input $T_1$ receives data corresponding to a relatively broad polar response from the auxiliary antenna 470.

The direction control unit 140 is connected via the coupler 30 to the variable phase shifters, for example the phase shifter 505, of the main antenna 450 for electronically steering the main antenna's relatively narrow polar reception response within the scene "S". The control unit 140 is also connected to the data store 410 so that data received from the ADC 515 through the coupler 30 at the data store 410 can be associated with a corresponding main antenna 450 steering direction. The control unit 140 is also connected to the selection unit 440 and to the weight calculation unit 430 for outputting direction control data thereto.

The weight calculation unit 430 is coupled at its input $T_2$ to the selection unit 440, and additionally at its input $T_3$ to the data store 410. Moreover, the calculation unit 430 is coupled at its output $T_4$ to the vector multiplier unit 420 for passing vector multiplication coefficients thereto. Furthermore, the data store 410 is connected at its $T_5$ output to the vector multiplier unit 420. Additionally, the multiplier unit 420 includes an output $P_o$ which is connected to the other equipment (not shown) via the port B as illustrated in FIG. 1.

Operation of the first configuration 400 illustrated in FIG. 3 will now be described.

Interrogating microwave radiation emitted by the antenna 40 (not shown in FIG. 3) is received at the scene "S" which reflects a portion thereof back as reflected radiation to the system 10. The receiving antenna 45 receives the reflected radiation at the main antenna 450 and also at the auxiliary antenna 470.

Microwave signals generated at the elements $E_1$ to $E_n$ in response to receiving the reflected radiation propagate through the variable phase shifters, wherein they are phase shifted, and then through the network 500 which combines the phase shifted signals to generate a microwave signal at the output Ho which the receiver 510 receives. The receiver 510 heterodynes the microwave signal to generate a baseobnd signal in the order of a few MHz frequency at the output $H_1$. The ADC 515 receives the baseband signal and converts it into corresponding digital data at the output $H_2$. The data passes through the coupler 30 to the input $H_3$ of the store 410 wherein the data is stored, and also to the SLB selection unit 440.

Microwave signals generated at the elements $X_1$ to $X_m$ in response to receiving the reflected radiation pass to their respective microwave receivers whereat the signals are heterodyned and thereby frequency shifted to provide corresponding base-band signals at a few MHz frequency. The base-band signals associated with the elements $X_1$ to $X_{m-1}$ are converted to corresponding digital data in the ADCs, for example in the ADC 530, and the digital data are then coupled through the coupler 30 to the input $H_3$ of data store 410 for storing therein.

The antenna element $X_m$ also receives radiation reflected from the scene "S" and generates a corresponding microwave signal which the receiver 525 receives and heterodynes to generate a base-band signal of a few MHz frequency at the output $Q_m$. The base-band signal propagates to the ADC 535 whereat it is converted to corresponding digital data which passes through the coupler 30 to the $T_1$ of the SLB selection unit 440.

The receivers associated with the elements $E_1$ to $E_n$ and the elements $X_1$ to $X_m$ are mounted in relatively close proximity to the receiving antenna 45 on the turret 25; such a location enables amplification and heterodyne mixing to be achieved at an early stage so that amplified base-band signals are passed through the coupler 30 to the port A of the processing unit 20, thereby reducing risk of signal cross-talk and improving signal/noise performance of the system 10.

The digital data output at the output $H_2$ and stored in the data store 410 corresponds to a narrow-beam polar response of the main antenna 450 whereas the digital data output at the output $R_m$ corresponds to a broad-beam polar response of the auxiliary antenna 470. The SLB selection unit 440 operates by multiplying data received at its input $H_4$ by a first multiplication coefficient and data received at its $T_1$ input by a second multiplication coefficient to generate first and second multiplied data respectively. The first and second multiplied data correspond to series of scaled data values representing temporal records of the narrow-beam and broad-beam polar responses of the antenna 45; each series is partitioned into range cells indicative of intervals of time at which data corresponding to the cells were generated by its associated ADCs. For each corresponding range cell of the first and second multiplied data, the SLB unit compares the second multiplied data with the first multiplied data; for a given range cell, if the second multiplied data of the cell is greater in magnitude than the corresponding first multiplied data of the cell, data associated with the given range cell is passed by the selection unit 440 to the weight calculation unit 430 for use in calculating adaptive weight coefficients for steering one or more nulls in directions of one or more interfering sources present in the scene "S" giving rise to interference causing the second multiplied data being greater than the first multiplied data. On account of filtering range cells selectively in this manner, the weight calculation unit 430 need not operate on data of all the range cells corresponding to radiation received at the main antenna 450; operating on the data of all the range cells would represent an excessively large computational workload for the weight calculation unit 430 to accommodate, the calculation unit performing, amongst other calculations, matrix inversions for determining adaptive weight coefficients for the multiplier unit 420.

When the system 10 is functioning to interrogate and receive reflected radiation from the scene "S", the scene "S" is regarded by the system 10 as comprising a mosaic of field cells. The direction control unit 140 operates to scan the polar response of the main antenna 450 electronically over a limited part of the mosaic, thereby providing the weight calculation unit 430 with a number of samples from different field cells subject to interference for use in calculating the adaptive weight coefficients for output to the multiplier unit 420.

The aforementioned first and second multiplication coefficients can be made variable to cope with different types of interference arising from the scene "S". Moreover, the multiplication coefficients can be predetermined prior to operating the system 10. If the weight calculation unit 430 uses range cell data from all field cells which are subject to interference, adaptive beam forming algorithms employed in the calculation unit 430 can sometimes be overloaded with data to process; such overload can occur in the case of several interfering sources emitting interference for a majority of the time. Conversely, if the calculation unit 430 suppresses data of all range cells subject to interference, the sample selector unit 270 will calculate a set of adaptive weight coefficients on insufficient sample data, such coefficients being ineffective at steering nulls in directions of sources of interference within the scene "S". The SLB selection unit 440 therefore has a function to provide a compromise selection of sample data for use by the weight calculation unit 430. The compromise selection is achieved by suitable choice of at least one of the first and second multiplication coefficients and dynamic adjustment thereof.

When sufficient sample data from range cells subject to interference are received by the calculation unit 430, the unit 430 proceeds to calculate adaptive weight coefficients based on sample data specified by the selection unit 440 and then outputs these coefficients at the output $T_4$ to the vector multiplier unit 420. The multiplier unit 420 subsequently performs vectorial multiplication of signals from the antenna 450 represented in data supplied at the output $T_5$ of the store 410 to steer nulls in the direction of interfering sources in the scene "S", thereby providing processed output data from the multiplier unit 420 at the output $P_O$ corresponding to that provided by a relatively narrow beam antenna whose nulls are adaptively steered to suppress the effects of interfering sources within the scene "S".

When operating, the weight calculation unit 430 performs standard adaptive beam forming calculations as referred to in the aforementioned book which is hereby incorporated by reference with regard to conventional techniques for calculating adaptive weight coefficients, for example as presented in Chapter 4 of the book.

In the processing unit 20, received signals from the antenna elements of the antenna 45 are processed and stored in the store 410 as described above for a period of time not less than a period of time between updates of adaptive weight coefficients calculated in the calculation unit 430; such updating of the coefficients occurs in the system 10 at a rate of once every 100 $\mu$sec. Such storage of the received signals assists the selection unit 440 to have signal data available for the calculation unit 430 which are representative of the behaviour of interfering sources in the scene "S" at a number of time instances, thereby improving the ability of the multiplier unit 420 to suppress the effects of such interfering 20 sources in output data provided from the unit 420.

Referring to FIG. 4, the second configuration 600 will now be described. The processing unit 20 of the configuration 600 is shown included within a dotted line 602. Moreover, the receiving antenna 45 of the configuration 600 is illustrated included within a dotted line 605.

The antenna 45 incorporates typically in a range of 100 to 5000 elements, although the antenna 45 preferably includes in the order of 2000 elements. Each element is identified in FIG. 4 by a symbol $Z_{ij}$ where an index i represents a set number and an index j indicates an element number in its associated set. In the antenna 45, there are q sets of antenna elements Z, each set including k elements.

Each element $Z_{ij}$ is connected via an associated microwave amplifier, a variable attenuator and then a variable phase shifter to a sub-array combiner associated with the set including the element. For example, the element $Z_{1,1}$ is the first element in the first set and is coupled through a microwave amplifier 610, then through a variable attenuator 620 and finally through a variable phase shifter 630 to a sub-array combiner 640 providing a combined microwave output $F_1$. All elements of the first set where the index i=1 are operable to provide microwave signals which feed into the combiner 640. Likewise, all elements of the second set where the index i=2 are operable to provide signals which feed into a combiner 650 providing a combined microwave output $F_2$, and so on until set q which is operable to provide signals which feed into a sub-array combiner 660 providing a combined microwave output $F_q$. Each combiner is connected to an associated microwave receiver; each receiver is operable to amplify and heterodyne microwave signals received thereat from its associated combiner to generate corresponding base-band signals having a frequency in the order of a few MHz; for example the combiners 640, 650, 660 are coupled to the receivers 670, 680, 690 respectively. Moreover, each receiver is connected to a corresponding ADC for converting the base-band signals into corresponding digital data $D_0$. Data outputs of the ADCs are connected through the coupler 30 to the data store 410 and to a fixed beam forming network 700; for example, the receivers 670, 680, 690 are connected through the ADCs 710, 720, 730 respectively and then through the coupler 30 to the data store 410 and the beam forming network 700. The network 700 is operable to combine the data $D_0$ to provide output data $D_1$ at its output, the output being connected to a first main beam data input of the selection unit 440.

A microwave output $F_{aux}$ is derived from the element $Z_{q,k}$ connected through an amplifier 740, and then through a variable attenuator 750 and a variable phase shifter 760. The output $F_{aux}$ is coupled to a microwave receiver 770 operable to amplify and heterodyne microwave signals received at the receiver 770 into a corresponding base-band signal at an output $S_{aux}$ which is coupled to an ADC 780. The ADC includes a data output which is connected via the coupler 30 to a second digital input of the selection unit 440.

The direction control unit 140 includes steering outputs $P_s$ for use in steering a main beam polar response of the receiving antenna 45. The outputs $P_s$ are connected to the data store 410, to the weight calculation unit 430 and also to the SLB selection unit 440. Moreover, the outputs $P_s$ are also connected via the coupler 30 to the variable attenuators and phase shifters, for example the attenuators 620, 750 and the shifters 630, 760, for steering the main beam response of the antenna 45.

A digital output $D_2$ of the selection unit 440 is coupled to a first digital input of the weight calculation unit 430. Likewise, a digital output $D_3$ from the data store 410 is also connected to a second digital input of the weight calculation unit 430. Moreover, a digital output from the data store 410 is coupled to a first data input of the vector multiplier unit 420. Furthermore, a vector coefficient output $D_5$ from the weight calculation unit 430 is connected to a second data input of the vector multiplier unit 420. The multiplier unit 420 includes the aforementioned output $P_O$ at which data corresponding to the main beam polar response of the antenna 45 is output, the output $P_O$ being corrected for interfering sources which are suppressed by nulls in the polar response of the antenna 45.

Operation of the configuration 600 illustrated in FIG. 4 will now be described.

The radiating antenna 40 emits interrogating microwave radiation pulses towards the scene "S" (not shown in FIG. 4). The scene reflects a portion of the microwave radiation which propagates as reflected radiation to the elements $Z_{ij}$ whereat it is received. In response to receiving reflected radiation from the scene, the elements $Z_{ij}$ generate corresponding microwave signals which are amplified, for example in the amplifiers 610, 740, attenuated in the variable attenuators, for example in the attenuators 620, 750, phase shifted in the variable phase shifters, for example in the phase shifters 630, 760, and then combined as sets in the combiners, for example the combiners 640, 650,660, to provide corresponding combined microwave signals $F_1$ to $F_q$. The microwave signals $F_m$, where m is an index in a range 1 to q, propagate to their respective microwave receivers, for example the signals $F_1$, $F_2$, $F_q$ propagate to the receivers 670, 680, 690 respectively, whereat they are amplified and heterodyned to provide corresponding base-band signals. The microwave signal output from the element $Z_{q,k}$ is amplified by the amplifier 740, attenuated by the attenuator 750 and then phase shifted by the shifter 760 to provide the signal $F_{aux}$ which propagates to the microwave receiver 770. The receiver 770 amplifies and heterodynes the signal $F_{aux}$ to generate the corresponding base-band signal $S_{aux}$.

The ADCs, for example the ADCs 710, 720, 730, 780, receive the base-band signals and convert them to corresponding digital data which the ADCs send via the coupler 30 to the data store 410 for storage therein and also to the beam forming network 700. The baseband band signal $S_{aux}$ is also converted in the ADC 780 to generate corresponding data which passes through the coupler 30 to the selection unit 440. The data supplied to the selection unit 440 from the ADC 780 corresponds to a broad beam polar response of the receiving antenna 45, broad in this context being in the order of 30° between response −3dB points.

The beam forming network 700 combines the data supplied from the combiners to provide the data $D_1$ corresponding to a narrow main beam polar response of the receiving antenna 45, narrow in this context being in the order of 1° at −3dB response points. The data from the ADC 780 is multiplied by a first scaling coefficient in the selection unit 440 to generate first scaled data. Likewise, the data $D_1$ from the beam forming network 700 is multiplied by a second scaling coefficient in the selection unit 440 to generate second scaled data For each range cell in the first and second scaled data, the first and second scaled data are compared; range cells whose first scaled data exceeds in magnitude the second scaled data are selected for outputting to the weight calculation unit 430 for use in calculating vector multiplication coefficients for output to the vector multiplier unit 420. Range cells whose first scaled data are less in magnitude than corresponding second scaled data are retained in the selection unit 440 and are not passed to the calculation unit 430. The first and second scaling coefficients can have values which are predetermined. Alternatively, their values can alternatively be dynamically variable in response to the nature of the first and second data, for example average value of the data or peak value of the data.

If necessary, the configuration 600 can obtain data samples from a number of field cells within the scene "S" for use in calculating vector multiplication coefficients in the weight calculation unit 430. For range cells identified by the selection unit 440 and passed to the calculation unit 430, the calculation unit 430 loads into it corresponding data stored in the data store 410; the calculation unit 430 then uses this data in standard beam nulling algorithms for steering nulls in the polar response of the receiving antenna 45 in the direction of interfering sources within the scene "S" by suitable choice of vector multiplication coefficients. The algorithms output these coefficients as the data $D_5$ to the vector multiplier unit 420 which multiplies data therein supplied from the ADCs via the data store 410 to provide output data at the output Po corresponding to a narrow beam polar response of the receiving antenna 45 in which nulls have been steered in the direction of interfering sources in the scene "S".

When operating, the weight calculation unit 430 performs standard adaptive beam forming calculations as referred to in the aforementioned book which is hereby incorporated by reference with regard to conventional techniques for calculating adaptive weight coefficients, for example as presented in Chapter 4 of the book.

Figure 5:
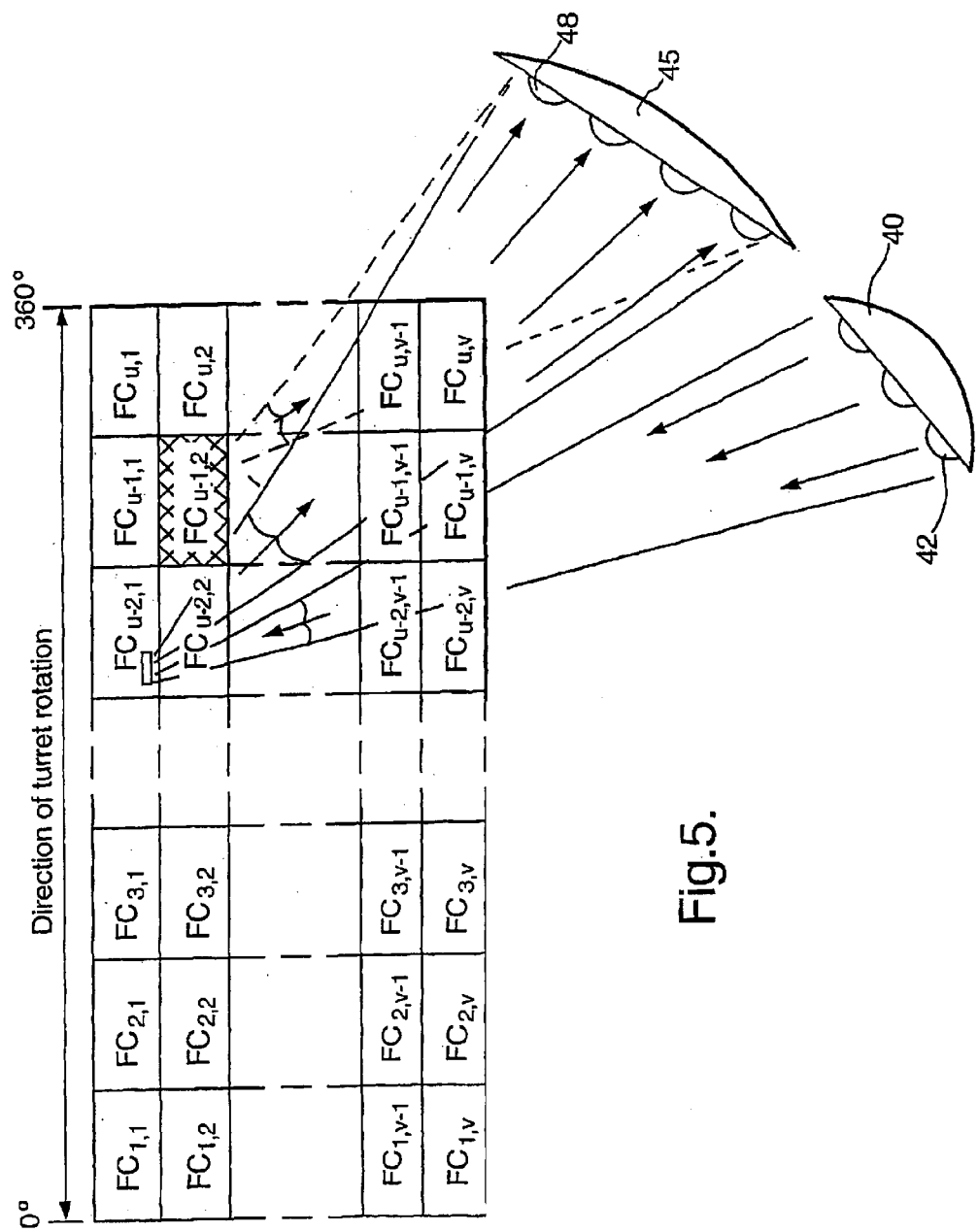
FIG. 5 is a schematic diagram of field cells susceptible to interrogation from the radar system.

In order to further elucidate operation of the system 10, the nature of field cells in the scene "S" will now be described with reference to FIG. 5; field cells of the scene "S" susceptible to interrogation from the system 10 are shown. The scene is partitioned into a number of field cells $FC_{a,b}$ arranged in a 2-dimensional array formation where an index a is indicative of field cell column, and an index b is indicative of field cell row. The index a is in a range of 1 to U, and the index b is in a range of 1 to V, there being U×V field cells within the scene "S". For example, $FC_{1,1}$ to $FC_{U,1}$ correspond to a horizontal row of field cells within the scene, whereas $FC_{3,1}$ to $FC_{3,V}$ correspond to a vertical column of field cells within the scene. In FIG. 5, the radiating antenna 40 interrogates a field cell $FC_{U-2,1}$ and the receiving antenna 45 receives radiation reflected from the field cell $FC_{U-2,1}$ and also interfering radiation from a neighbouring diagonal field cell $FC_{U-1,2}$. Thus, signals output from the receiving antenna 45 comprise a superposition of radiation contributions from both of the field cells $FC_{U-2,1}$, $FC_{U-1,2}$.

Although the antennae 40, 45 can be steered electronically to a limited extent within the scene, for example around a cluster of 100 field cells for a given position of the turret 25, it is not practical to electronically scan the antennae 40, 45 over the entire scene, thereby necessitating a degree of mechanical antenna scanning to be employed. The scene "S" is preferably partitioned into several thousand field cells. In its narrow beam response, the receiving antenna 45 receives radiation predominantly from individual field cells; conversely, the receiving antenna 45 receives radiation from in the order of several hundred field cells in its broad beam response.

Referring now to FIG. 6, there is indicated by 900 a schematic representation of radar signals received from selected field cells in FIG. 5. The signals are partitioned in range cells, the range cells corresponding to signal reception time after emitting interrogating microwave radiation pulses towards the field cells in the scene "S" to generate the signals. For example, a first range cell is denoted by $RC_1$ and a last range cell by $RC_Y$ where there are Y range cells for including the full duration of signals generated in response to receiving reflected radiation from the scene "S" at the antenna 45.

In FIG. 6, "Main Beam Sample 1" and "Main Beam Sample 2" correspond to the data $H_2$ output from the ADC 515 in FIG. 3 subject to multiplication by the aforementioned first multiplication coefficient or the aforementioned second scaling coefficient, or alternatively to the data $D_1$ output from the beam forming network 700 in FIG. 4 subject to multiplication by the aforementioned second multiplication coefficient or the aforementioned first scaling coefficient. These "Main Beam Samples 1 and 2" correspond to a narrow beam polar response of the antenna 45 as described in the foregoing. Moreover, "SLB Sample 1" and "SLB Sample 2" are associated with the "Main Beam Sample 1" and "Main Beam Sample 2" respectively. These SLB Samples 1 and 2 represent broad beam polar responses of the auxiliary antenna 470 in FIG. 3 as conveyed in the data $T_1$, or alternatively of the data output from the ADC 780 in FIG. 4.

"Main Beam Sample 1" is a radar reflection response from the field cell $FC_{U-2,1}$ in FIG. 5. The field cell $FC_{U-1,2}$ in the scene "S" emits pulsed interference which is also observed in the "Main Beam Sample 1" in the form of residual peaks 905, 910 in range cells $RC_2$, $RC_{Y-2}$ respectively. Radar pulse reflections from the field cell $FC_{U-2,1}$ are represented by peaks 915, 920. The residual peaks 905, 910 are more clearly identified in the broad beam polar response, namely "SLB Sample 1" where peaks 925, 930 correspond to the peaks 905, 910 respectively. The peaks 925, 930 are normalised to a scale $N_s$ and are greater in magnitude than the peaks 905, 910 which are normalised to a scale $N_m$; as a consequence, the "Main Beam Sample 1" for range cells $RC_2$ and $RC_{Y-2}$ are selected by the SLB selection unit 440 for output to the weight calculation unit 430 for use in calculating vector multiplier coefficients for the vector multiplier unit 420, the unit 420 operable to steer one or nulls towards to range cell $FC_{U-1,2}$ in the polar response corresponding to the output $P_0$.

The weight calculation unit 430 can use one or more main beam samples for determining the vector multiplier coefficients. For example, the calculation unit 430 can also analyse "Main Beam Sample 2" which includes residual interference peaks 940, 945 in range cells $RC_3$, $RC_{Y-1}$ respectively corresponding to interference peaks 950, 955 respectively in "SLB Sample 2"; the calculation unit 430 is then operable to output data corresponding to the "Main Beam Sample 2" field cells $RC_3$ and $RC_{y-1}$ to the weight calculation unit 430 for use therein, the "SLB Sample 2" peaks 950, 955 subject to normalisation to $N_s$ being of greater magnitude relative to the peaks 940, 945 respectively subject to normalisation to $N_m$.

Decisions made by the selection unit 440 to use particular range cells FC in calculating vector multiplier coefficients are represented in logical form by the peaks $P_1$ to $P_4$ where logic 1 corresponds to output to the weight calculation unit 430, whereas logic 0 corresponds to suppression of data so that it is not used for calculating adaptive weight coefficients.

The "Main Sample 1 and "Main Sample 2" are generated in response to interrogating radar pulses emitted at mutually different times. Moreover, interfering pulses, for example the pulses 925, 930, 950, 955, are not necessarily synchronised to the interrogating pulses, although in some cases interrogating sources can attempt to disguise their presence by such synchronisation. The configurations 400, 600 are effective at dealing with both synchronous and asynchronous situations on account of the manner in which the selection unit 440 selects its data for output to the weight calculation unit 430 as described in the foregoing.

It will be appreciated that modifications can be made to the system 10 without departing from the scope of the invention. Subparts within the processing unit 20 can be substituted by other units provided that they perform an overall signal processing function as described above. Furthermore, the antennae 40, 45 can be combined to form a single multielement antenna where its elements are each equipped with circulators for isolating signals supplied to the elements for emission therefrom as radar radiation towards the scene "S" and also for isolating signals generated in response to received radiation reflected from the scene "S".

Additionally, the antennae 40, 45 can be substituted with a volume array of antenna elements or a "Crows's nest" profile conformal array of antenna elements which are electronically steerable over relatively large angles, for example such that their pointing direction is electronically steerable to scan over the entire scene "S". Such electronically steerable arrays enable the turret 25 and the coupler 30 to be dispensed with, and additionally enable more rapid agile interrogation of the scene "S" to be achieved.

What is claimed is:

1. A method of non-continuous jamming interference suppression in a radar system incorporating emitting means for emitting interrogating radiation towards a remote scene and receiving means for receiving corresponding echo radiation returned from the scene in response to the interrogating radiation, the method including the steps of:
    (a) emitting the interrogating radiation from the emitting means towards a selected region of the scene;
    (b) receiving first echo radiation substantially from the selected region of the scene at the receiving means and generating a corresponding first received signal;
    (c) receiving second echo radiation substantially from the selected region and other regions surrounding the selected region and generating a corresponding second received signal;
    (d) mutually comparing the first and second signals and determining therefrom portions of the first signal subject to non-continuous jamming interference;
    (e) repeating steps (a) to (d) where necessary for one or more other selected regions until sufficient samples of the signals are available for performing an adaptive weight calculation;
    (f) selectively using the portions of the first signal where non-continuous jamming interference is detected in the calculation for calculating adaptive weight coefficients;
    (g) processing the signals using the adaptive weight coefficients to generate an overall output from the system corresponding to radiation reflected from one or more selected regions, the overall output being at least partially corrected for non-continuous jamming interference enabling target detection during periods of such interference; and
    (h) repeating steps (a) to (g) until all the selected regions of the scene to be interrogated have been interrogated.

2. A method according to claim 1 wherein the signals are stored in storing means of the system for a period not less than that required for updating the adaptive weight coefficients.

3. A method according to claim 1 wherein, in step (d), a condition where the second signal is greater in magnitude than the magnitude of the first signal subject to a threshold scaling constant for a given selected region is indicative that the first signal is affected by interference.

4. A method according to claim 3 wherein the threshold scaling constant is made variable for coping with different types of interference.

5. A method according to claim 1 wherein the receiving means is electronically steerable to different selected regions of the scene.

6. A method according to claim 1 wherein the receiving means is mechanically steerable to different selected regions of the scene.

7. A method according to claim 1 wherein the receiving means comprises a multielement antenna and the adaptive weight coefficients are used to vectorially multiply signals generated by the elements in response to radiation received from the scene thereat for generating the overall output from the system.

8. A method according to claim 1 wherein, in step (a), the emitting means is electronically steerable to different selected regions of the scene.

9. A method according to claim 1 wherein, in step (a), the emitting means is mechanically steerable to different selected regions of the scene.

* * * * *